(12) United States Patent
Peterson et al.

(10) Patent No.: US 8,893,871 B1
(45) Date of Patent: Nov. 25, 2014

(54) STEERABLE DISCHARGE CHUTE

(75) Inventors: Arnold Neil Peterson, Eugene, OR (US); Bradley Simon Harness, Springfield, OR (US); John Bandstra, Delta (CA)

(73) Assignee: Astec Industries, Inc., Chattanooga, TN (US)

( * ) Notice: Subject to any disclaimer, the term of this patent is extended or adjusted under 35 U.S.C. 154(b) by 399 days.

(21) Appl. No.: 13/373,329

(22) Filed: Nov. 10, 2011

Related U.S. Application Data (60) Provisional application No. 61/413,215, filed on Nov. 12, 2010.

(51) Int. Cl.
*B65G 11/00* (2006.01)
*B65G 11/12* (2006.01)
*B65G 41/02* (2006.01)
*B07B 15/00* (2006.01)

(52) U.S. Cl.
USPC .......................................................... 193/22

(58) Field of Classification Search
None
See application file for complete search history.

(56) References Cited

U.S. PATENT DOCUMENTS 5,441,361 A * 8/1995 Campbell ....................... 404/90

* cited by examiner

*Primary Examiner* — Kavel Singh
(74) *Attorney, Agent, or Firm* — Chambliss, Bahner & Stophel, P.C.

(57) ABSTRACT

A discharge chute for a material reducing machine having a discharge opening includes a plurality of adjacent chute segments and a linkage system. The plurality of adjacent chute segments includes a rear chute segment, an intermediate chute segment and a front chute segment, each of which is pivotally connected to an adjacent chute segment. The linkage system includes a plurality of links that interconnect the adjacent chute segments, and an actuator that is adapted to cause the discharge chute to be steered to the left by pivoting the intermediate chute segment to the left with respect to the adjacent rear chute segment, and to cause the discharge chute to be steered to the right by pivoting the intermediate chute segment to the right with respect to the adjacent rear chute segment.

20 Claims, 8 Drawing Sheets

STEERABLE DISCHARGE CHUTE

CROSS-REFERENCE TO RELATED APPLICATION

This application claims the benefit of U.S. Provisional Patent Application No. 61/413,215, which was filed on Nov. 12, 2010.

FIELD OF THE INVENTION

The present invention relates to a material reducing machine that includes a discharge outlet. More particularly, it relates to a steerable discharge chute for such a machine.

BACKGROUND OF THE INVENTION

Material reducing machines are used to reduce larger pieces of material into smaller pieces by cutting, chopping, shredding or breaking. Generally, a material reducing machine will have an enclosure for a reducing mechanism, such as a rotating working drum equipped with blades, knives or hammers. The enclosure will typically have an inlet through which the larger materials to be reduced are introduced, and a discharge outlet through which the smaller materials are discharged after reduction. In some types of material reducing machines, such as most common wood chippers, the action of the rotating working drum will impart a discharging force to the reduced material in the direction of the discharge outlet. In other types of material reducing machines, a fan, conveyor or other mechanism may be employed to transport, or to assist in transporting, the reduced material to the discharge outlet.

It is common for the discharge chute on a material reducing machine to be fixed so that the material is always discharged in a single direction. It is also common for the discharge chute on a material reducing machine to be relatively short, so that there is little control over the discharging material.

It would be advantageous if a discharge chute could be developed for a material reducing machine that could be steered to direct the material being discharged through a range of angles to the left and to the right of the centerline of the machine (where the discharge outlet is on one end of the machine so that material exits the discharge outlet along the centerline of the machine). It would also be advantageous if such a discharge chute could be provided that was scalable to any suitable and convenient length.

ADVANTAGES OF THE INVENTION

Among the advantages of the present invention is that it provides a discharge chute for a material reducing machine that can be steered to the left and to the right of the centerline of the machine (where the discharge outlet is on one end of the machine so that material exits the discharge outlet along the centerline of the machine). This discharge chute is comprised of a plurality of chute segments, and the number of segments can be selected to provide a discharge chute of any suitable and convenient length.

Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as") herein is intended merely to better illuminate the invention and not to place a limitation on the scope of the invention, unless otherwise indicated by the claims. Nothing in the specification should be construed as indicating any non-claimed element as essential to the practice of the invention.

Various terms are specifically defined herein. These terms are to be given their broadest possible construction consistent with such definitions, as follows:

The term "material reducing machine" refers to a machine that is adapted to cut, chop, shred, break or otherwise reduce material into smaller pieces.

The terms "upper", "top" and similar terms, when used in reference to a relative position or direction on or with respect to a discharge chute for a material reducing machine, or a component or portion of such a discharge chute, refer to a relative position or direction that is farther away from the ground on which the material reducing machine is placed for operation.

The terms "lower", "bottom" and similar terms, when used in reference to a relative position or direction on or with respect to a discharge chute for a material reducing machine, or a component or portion of such a discharge chute, refer to a relative position or direction that is nearer the ground on which the material reducing machine is placed for operation.

The term "front end" and similar terms refer to the end of a discharge chute for a material reducing machine, or a component or portion of such a discharge chute, that is farthest from the discharge outlet of the material reducing machine along the path of discharge of material from such machine.

The terms "forward", "in front of" and similar terms, as used herein to describe a relative position or direction on or in connection with a discharge chute for a material reducing machine or a component of such discharge chute, refer to a relative position towards the front end of the discharge chute.

The terms "back end", "rear end" and similar terms refer to the end of a discharge chute for a material reducing machine, or a component or portion of such a discharge chute, that is nearest the discharge outlet of the material reducing machine along the path of discharge of material from such machine.

The terms "rearward", "behind" and similar terms, as used herein to describe a relative position or direction on or in connection with a discharge chute of a material reducing machine or a component of such discharge chute, refer to a relative position or direction towards the rear end of the discharge chute.

The term "discharge direction" means the direction from the back end of the rear chute segment towards the front end of the rear chute segment, along the centerline of such rear chute segment. The discharge direction is typically coincident with the centerline of the material reducing machine.

The term "left", as used herein to describe the steering of a discharge chute segment or a discharge chute comprising a plurality of pivotally connected chute segments, refers to a position or orientation towards the left, as viewed by an observer who is observing in the discharge direction.

The term "right", as used herein to describe the steering of a discharge chute segment or a discharge chute comprising a plurality of pivotally connected chute segments, refers to a position or orientation towards the right, as viewed by an observer who is observing in the discharge direction.

The term "link" refers to a structural component of a linkage system that is adapted to be pivotally attached to a pivot mount on a chute segment of the discharge chute and/or to another link.

The term "actuator" refers to an electric, hydraulic, electro-hydraulic or mechanical device that is adapted to apply a force to a component of a linkage system.

The term "linear actuator" refers to an actuator that generates force which is directed in a straight line. One common example of a "linear actuator" is a hydraulic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder. If the rod is attached to a link, it will apply a force in one direction when extending from the cylinder and will apply a force in another direction when retracting into the cylinder.

SUMMARY OF THE INVENTION

The invention comprises a discharge chute for a material reducing machine having a discharge opening. The discharge chute comprises a plurality of adjacent chute segments and a linkage system. The plurality of adjacent chute segments includes a rear chute segment, an intermediate chute segment and a front chute segment, each of which is pivotally connected to an adjacent chute segment. The linkage system comprises a plurality of links that interconnect the adjacent chute segments, and an actuator that is adapted to cause the discharge chute to be steered to the left by pivoting the intermediate chute segment to the left with respect to the adjacent rear chute segment, and to cause the discharge chute to be steered to the right by pivoting the intermediate chute segment to the right with respect to the adjacent rear chute segment.

In a preferred embodiment of the invention, the plurality of links includes a rear link, and the actuator is adapted to apply a first linear force to the rear link to cause the linkage system to steer the discharge chute to the left by pivoting the intermediate chute segment to the left with respect to the adjacent rear chute segment, and a second linear force to the rear link to cause the linkage system to steer the discharge chute to the right by pivoting the intermediate chute segment to the right with respect to the adjacent rear chute segment.

In order to facilitate an understanding of the invention, the preferred embodiment of the invention, as well as the best mode known by the inventors for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and wherein.

DESCRIPTION OF THE PREFERRED EMBODIMENTS OF THE INVENTION

Figure 1:
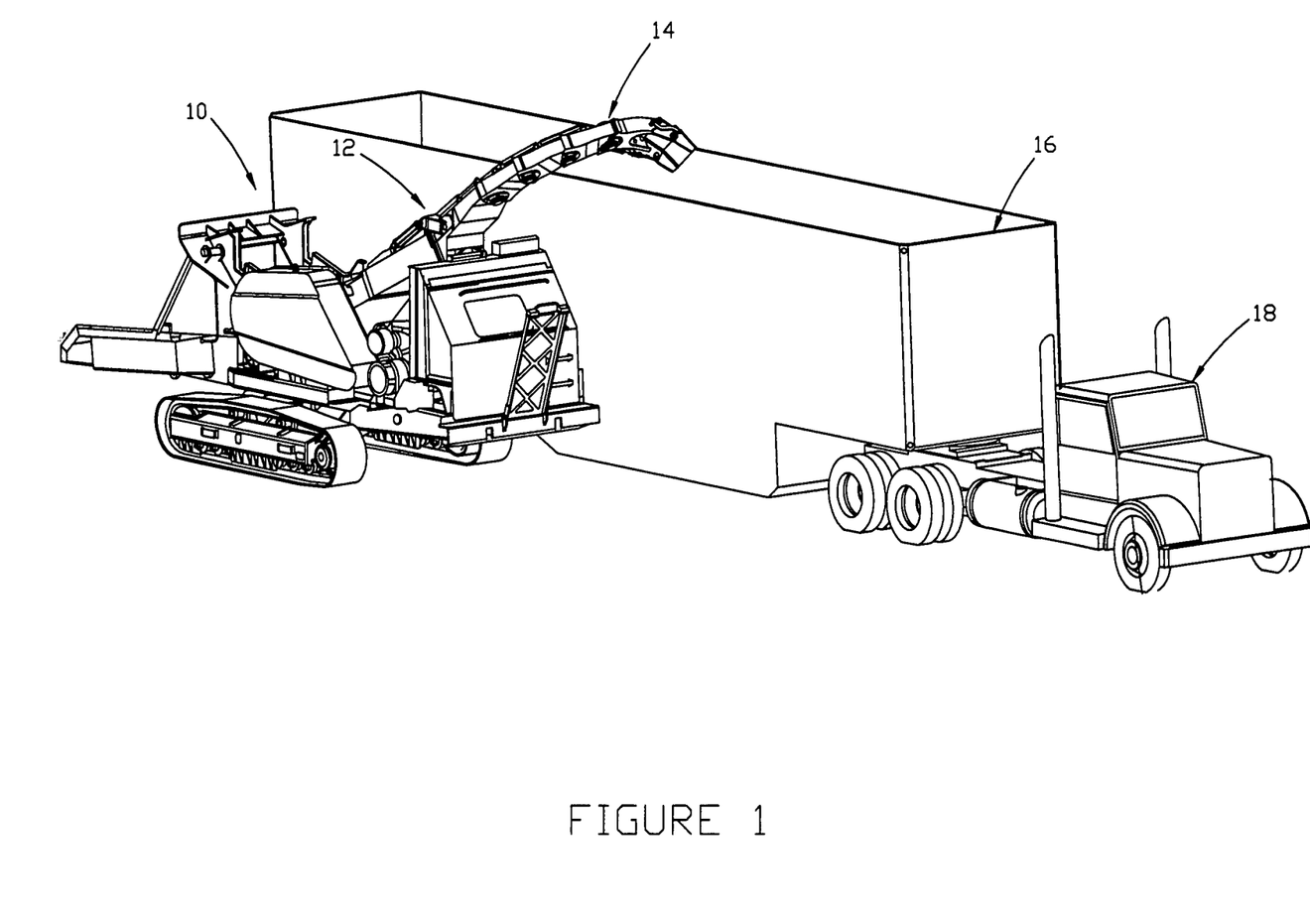
FIG. 1 is a perspective view of a material reducing machine that is equipped with a preferred embodiment of the invention, illustrating the material reducing machine and discharge chute in use in connection with a vehicle for receiving and hauling material produced by the machine.

The drawings illustrate a steerable discharge chute for a material reducing machine comprising drum-type wood chipper 10 having a discharge outlet 12. Wood chipper 10 is a track mounted material reducing machine of conventional design. Attached to wood chipper 10 at discharge outlet 12 is steerable discharge chute 14. By steering discharge chute 14 to the left (as shown in FIG. 1) or to the right, wood chips that have been reduced by the wood chipper can be directed in a desired direction, such as into open trailer 16 that is attached to tractor 18.

Referring now to FIGS. 2-8, discharge chute 14 comprises a plurality of adjacent chute segments including rear chute segment 20, first intermediate chute segment 22, second intermediate chute segment 24, third intermediate chute segment 26 and front chute segment 28. Each chute segment is open at both ends so that material from a material reducing machine such as wood chipper 10 can flow or be transported therethrough. Of course, the number of intermediate chute segments can vary with the desired length and/or the desired steerable angle of the discharge chute. In the embodiment of the invention illustrated in the drawings, the discharge chute includes a rear chute segment, three intermediate chute segments and a front chute segment.

Rear end 30 of rear chute segment 20 is adapted to be attached to discharge outlet 12 of wood chipper 10. Each chute segment has a front end and a rear end, and the rear end of each chute segment in front of the rear chute segment is pivotally connected to the front end of an adjacent chute segment located behind it. Thus, for example, rear end 31 of first intermediate chute segment 22 is pivotally connected to front end 32 of adjacent rear chute segment 20 at pivotal connection 33. Rear end 34 of second intermediate chute segment 24 is pivotally connected to front end 35 of first intermediate chute segment at pivotal connection 36. Rear end 37 of third intermediate chute segment 26 is pivotally connected to front end 38 of second intermediate chute segment 24 at pivotal connection 39, and rear end 40 of front chute segment 28 is pivotally connected to front end 41 of third intermediate chute segment 26 at pivotal connection 42. Front chute segment 28 also has a front end 43 to which flow diverter 44 is pivotally attached. Flow diverter 44 may be pivoted by linear actuator 45 (best shown in FIG. 6) with respect to front end 43 of front chute segment 28.

Figure 9:
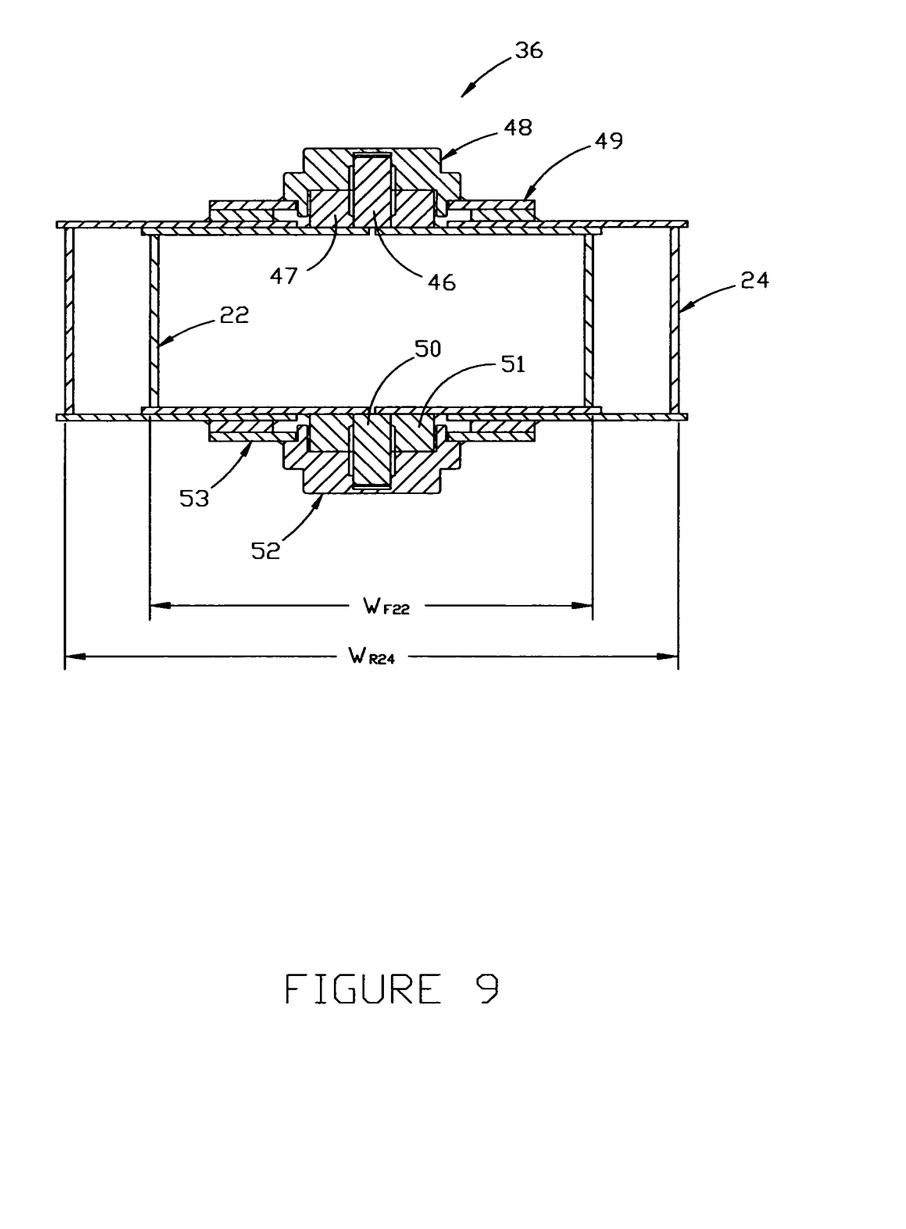
FIG. 9 is a sectional view of a portion of the discharge chute of FIG. 8, taken through line 9-9 of FIG. 8.

FIG. 9 illustrates pivotal connection 36 between first intermediate chute segment 22 and second intermediate chute segment 24. Pivotal connection 36 is representative of the other pivotal connections between adjacent chute segments. As shown in FIG. 9, pivotal connection 36 includes upper pivot pin 46 which is mounted in bushing 47 that is affixed to the top of front end 35 of first intermediate chute segment 22. Cap 48 covers the upper pivot pin and is attached to annular flange 49, which is affixed to the top of rear end 34 of second intermediate chute segment 24. Similarly, lower pivot pin 50 is mounted in bushing 51 that is affixed to the bottom of front end 35 of first intermediate chute segment 22. Cap 52 covers the lower pivot pin and is attached to annular flange 53, which is affixed to the bottom of rear end 34 of second intermediate chute segment 24. This pivotal connection permits pivotal motion between adjacent chute segments without interfering with the flow of material through the discharge chute.

Figure 2:
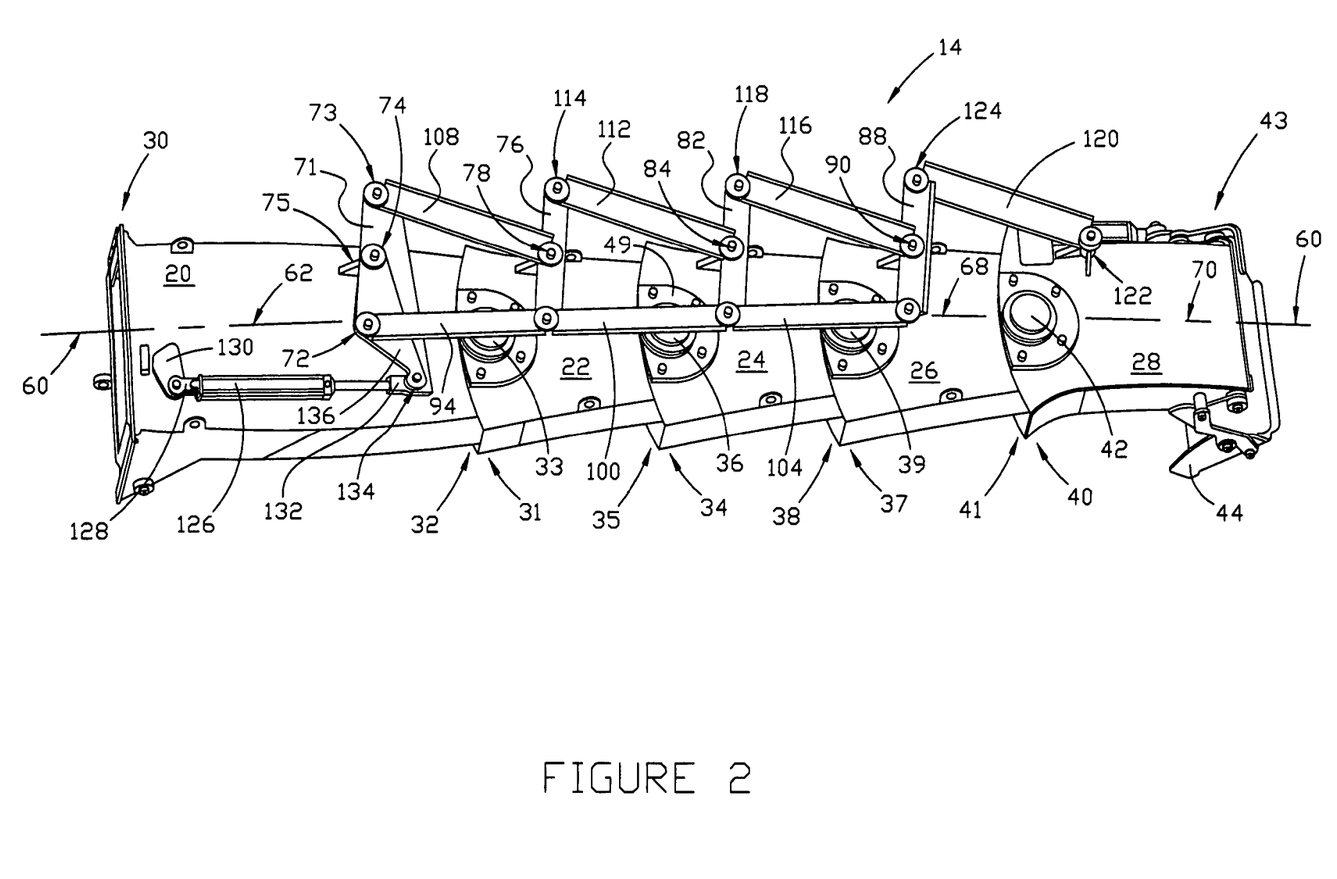
FIG. 2 is a top perspective view of the preferred embodiment of the invention.
Figure 3:
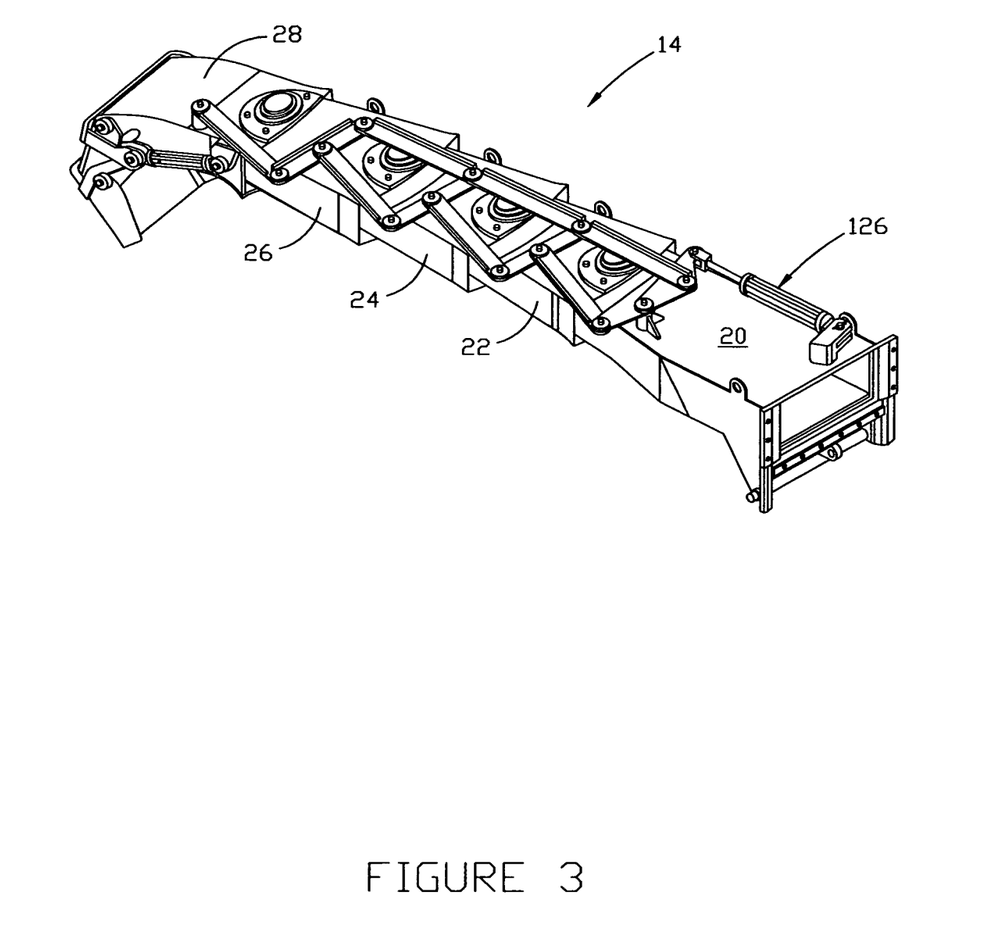
FIG. 3 is a side perspective view of the discharge chute of FIG. 2.
Figure 6:
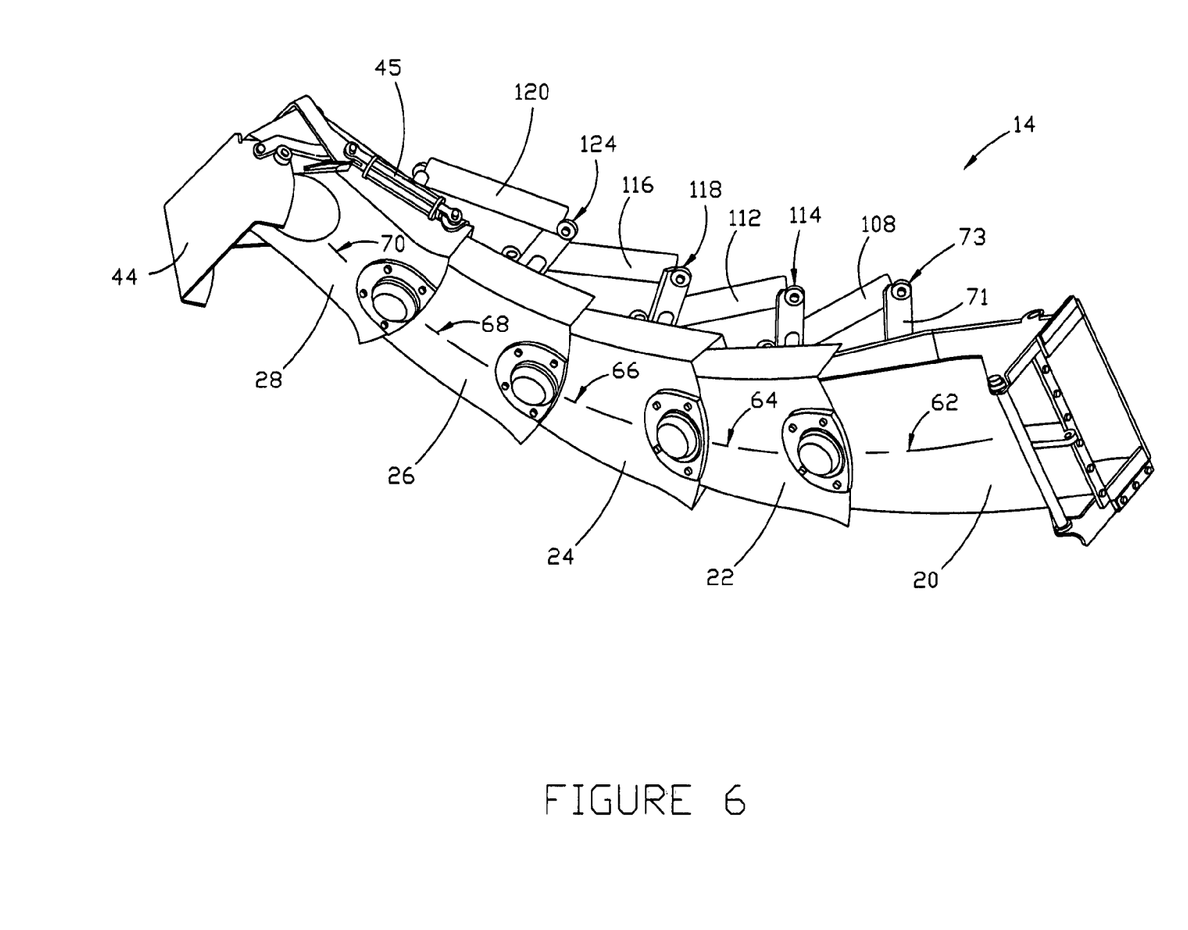
FIG. 6 is a bottom perspective view of the discharge chute of FIG. 5.

Each chute segment has a centerline that is coincident with central axis 60 (shown in FIG. 2) of discharge chute 14 when the discharge chute is in the neutral position (i.e. neither steered to the left or to the right, as shown in FIGS. 2, 3, 7 and 8). The chute segments are arranged in the assembly so that the centerlines of adjacent chute segments intersect at the pivotal connection between such chute segments. Thus, for example, as shown in FIG. 2, rear chute segment 20 has centerline 62 that is coincident with the discharge direction when rear end 30 of rear chute segment 20 is attached to discharge outlet 12 of wood chipper 10. As best shown in FIG. 6, first intermediate chute segment 22 has centerline 64, second intermediate chute segment 24 has centerline 66, third intermediate chute segment 26 has centerline 68 and front chute segment has centerline 70. Furthermore, both centerline 62 of rear chute segment 20 and centerline 64 of first intermediate chute segment 22 pass through the center of pivotal connection 33 between rear chute segment 20 and first intermediate chute segment 22. Similarly, centerline 64 of first intermediate chute segment 22 and centerline 66 of second intermediate chute segment 24 pass through the center of pivotal connection 36 between first intermediate chute segment 22 and second intermediate chute segment 24. Centerline 66 of second intermediate chute segment 24 and centerline 68 of third intermediate chute segment 26 pass through the center of pivotal connection 39 between second intermediate chute segment 24 and third intermediate chute segment 26. Finally, centerline 68 of third intermediate chute segment 26 and centerline 70 of front chute segment 28 pass through pivotal connection 42 between third intermediate chute segment 26 and front chute segment 28. Also, as shown in various drawings, it is preferred that the rear width of each intermediate chute segment, and that of the front chute segment, be larger than the front width of the adjacent chute segment that is behind it, in order that the chute segments may pivot with respect to each other. Thus, for example, the width at rear end 31 of first intermediate chute segment 22 is larger than the width at front end 32 of rear chute segment 20. Similarly, the width $W_{R24}$ (see FIG. 9) at rear end 34 of second intermediate chute segment 24 is larger than the width $W_{F22}$ at front end 35 of first intermediate chute segment 22. The width at rear end 37 of third intermediate chute segment 26 is larger than the width at front end 38 of second intermediate chute segment 24, and the width at rear end 40 of front chute segment 28 is larger than the width at front end 41 of third intermediate chute segment 26.

Figure 4:
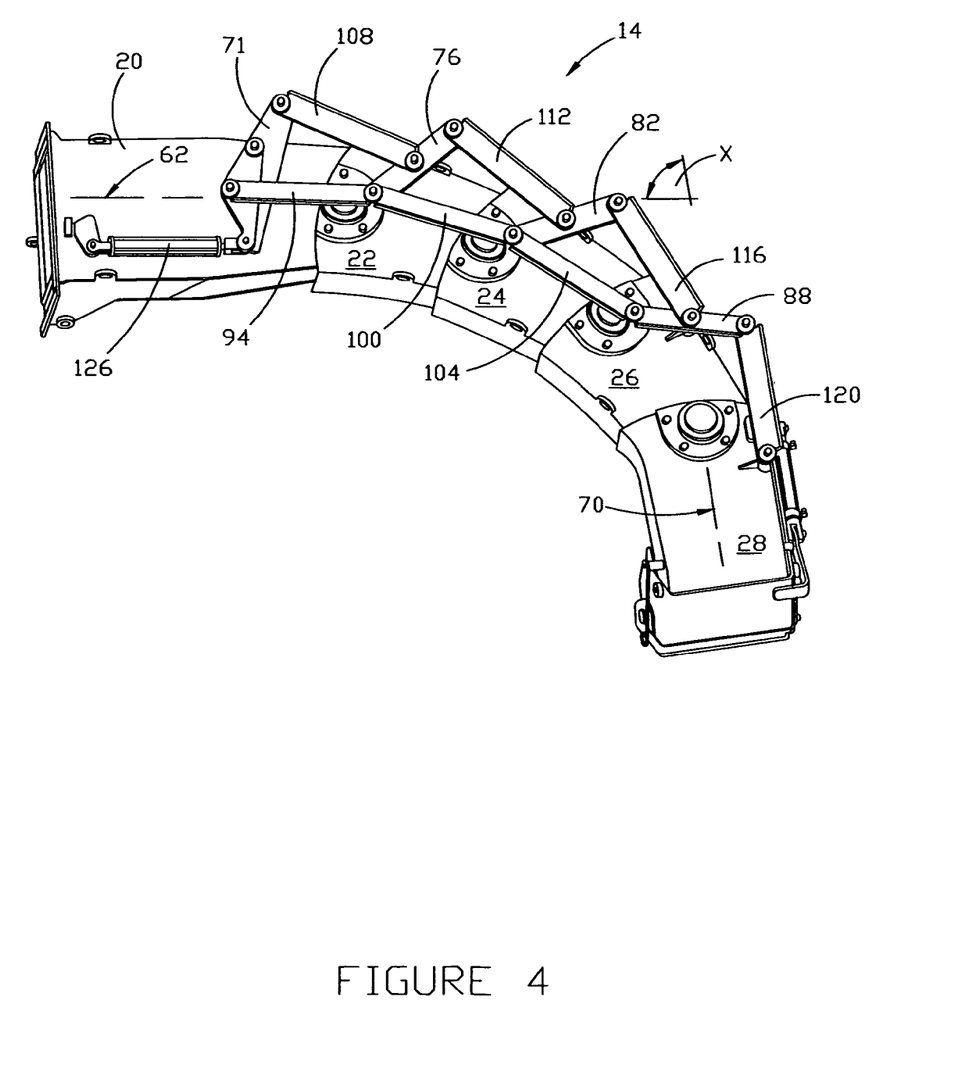
FIG. 4 is a top perspective view of the preferred embodiment of the invention, showing the discharge chute in a position steered to the right.
Figure 5:
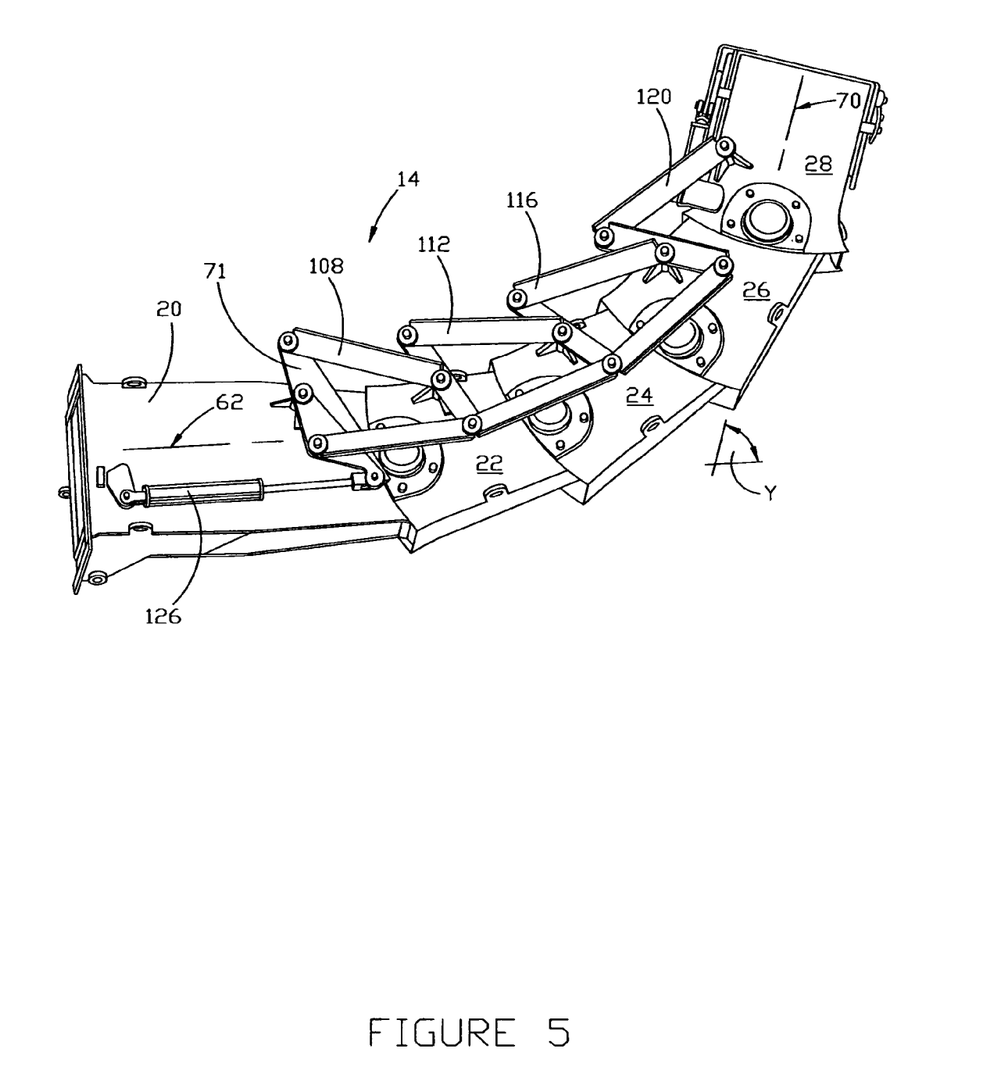
FIG. 5 is a top perspective view of the preferred embodiment of the invention, showing the discharge chute in a position steered to the left.

Discharge chute 14 includes a linkage system comprising a plurality of links that interconnect the adjacent chute segments, and an actuator that is adapted to cause the discharge chute to be steered to the left by pivoting each chute segment to the left with respect to the adjacent chute segment that is behind it, and to cause the discharge chute to be steered to the right by pivoting each chute segment to the right with respect to the adjacent chute segment that is behind it. Preferably, as shown in FIG. 4, the linkage system is adapted to steer the discharge chute to the right through an angular range X of up to about 75°, as measured by the angle formed by the intersection of the centerline of the front chute segment and the discharge direction. Similarly, as shown in FIG. 5, the linkage system is adapted to steer the discharge chute to the left through an angular range Y of up to about 75°, as measured by the angle formed by the intersection of the centerline of the front chute segment and the discharge direction.

Figure 7:
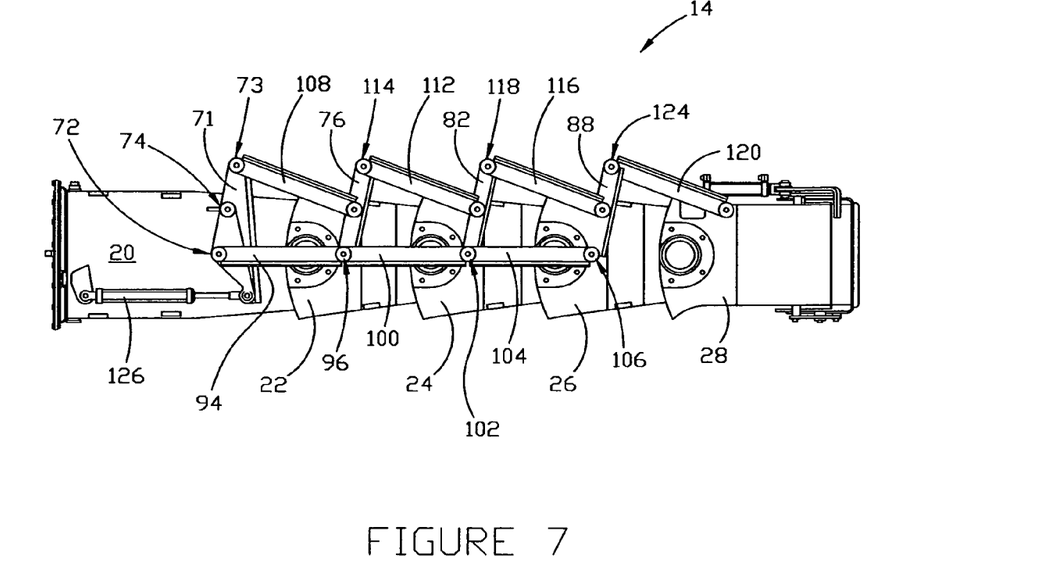
FIG. 7 is a top view of the discharge chute of FIGS. 2 and 3.
Figure 8:
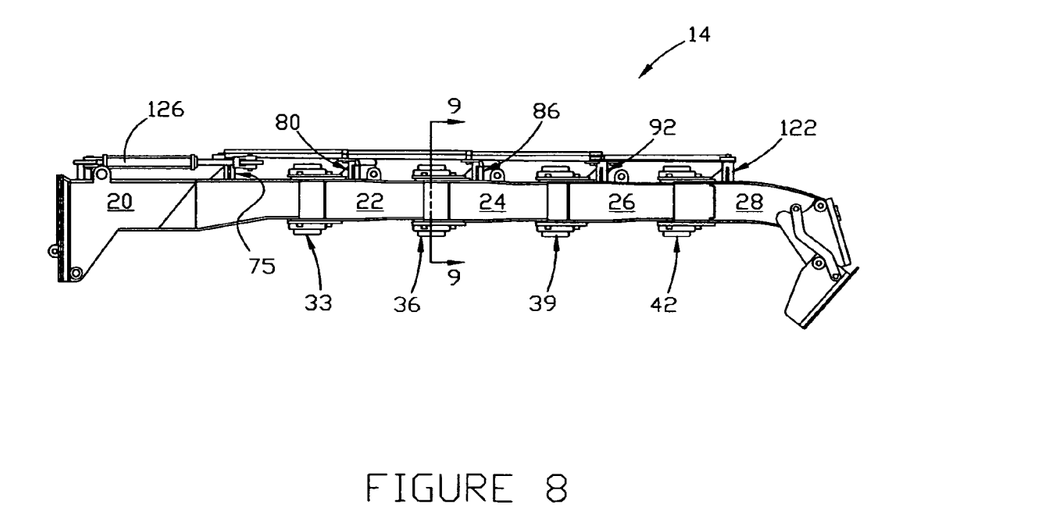
FIG. 8 is a side view of the discharge chute of FIG. 7.

Referring again to FIGS. 2, 7 and 8, the plurality of links of the preferred linkage system includes rear link 71. Preferably, rear link 71 has a centerline pivot point 72, a left pivot point 73 and an intermediate pivot point 74 located between centerline pivot point 72 and left pivot point 73. Preferred rear link 71 is pivotally mounted on pivot mount 75 (best shown in FIG. 8) of rear chute segment 20. Preferably, the linkage system includes a pivot link for each intermediate chute section, each of which has a left pivot point, a right pivot point and an intermediate pivot point between the left pivot point and the right pivot point. Each pivot link is pivotally mounted at its intermediate pivot point on a pivot mount of the intermediate chute section with which it is associated. Thus, as best shown in FIGS. 2 and 8, pivot link 76 is pivotally mounted at its intermediate pivot point 78 on pivot mount 80 of intermediate chute segment 22. Similarly, pivot link 82 is pivotally mounted at its intermediate pivot point 84 on pivot mount 86 of intermediate chute segment 24, and pivot link 88 is pivotally mounted at its intermediate pivot point 90 on pivot mount 92 of intermediate chute segment 26.

The preferred linkage system also includes a centerline link that is associated with each intermediate chute segment, which centerline link has a front end and a rear end. The front end of each centerline link is pivotally mounted to the pivot link that is associated with such intermediate chute segment at the right pivot point of such pivot link. Thus, as best shown in FIG. 7, the front end of centerline link 94 is pivotally mounted to the right pivot point 96 of pivot link 76 which is associated with first intermediate chute segment 22. The rear end of centerline link 94 is pivotally mounted to centerline pivot point 72 of rear link 71. The front end of centerline link 100 is pivotally mounted to right pivot point 102 of pivot link 82 which is associated with second intermediate chute segment 24. The rear end of centerline link 100 is pivotally mounted to right pivot point 96 of pivot link 76 and to the front end of centerline link 94. The front end of centerline link 104 is pivotally mounted to right pivot point 106 of pivot link 88 which is associated with third intermediate chute segment 26. The rear end of centerline link 104 is pivotally mounted to right pivot point 102 of pivot link 82 and to the front end of centerline link 100.

The preferred linkage system also includes a steering link that is associated with each intermediate chute segment, and a steering link which is associated with the front chute segment. Each steering link has a front end and a rear end. The front end of each steering link that is associated with an intermediate chute segment is pivotally mounted to the intermediate pivot point of the pivot link that is associated with such intermediate chute segment. Thus, as best shown in FIG. 2, the front end of steering link 108 is pivotally mounted to intermediate pivot point 78 of pivot link 76 that is associated with first intermediate chute segment 22. The rear end of steering link 108 is pivotally mounted at left pivot point 73 to rear link 71. The front end of steering link 112 is pivotally mounted to intermediate pivot point 84 of pivot link 82 that is associated with second intermediate chute segment 24. The rear end of steering link 112 is pivotally mounted at left pivot point 114 to pivot link 76 that is associated with first intermediate chute segment 22. The front end of steering link 116 is pivotally mounted to intermediate pivot point 90 of pivot link 88 that is associated with third intermediate chute segment 26. The rear end of steering link 116 is pivotally mounted at left pivot point 118 to pivot link 82 that is associated with second intermediate chute segment 24. The front end of steering link 120 is pivotally mounted to pivot mount 122 of front chute segment 28. The rear end of steering link 120 is pivotally mounted at left pivot point 124 to pivot link 88 that is associated with third intermediate chute segment 26. As shown in the drawings, the preferred linkage system includes links that are arranged to comprise a four-bar linkage for each intermediate chute segment.

The linkage system also includes an actuator, such as preferred linear actuator 126. Base end 128 of the linear actuator is attached to bracket 130 of rear chute segment 20, and rod end 132 of linear actuator 126 is pivotally attached to pivot point 134 of right extension 136 of rear link 71. This arrangement permits the linear actuator to apply a first linear force to the rear link by extending the rod end, as shown in FIG. 5, to steer the discharge chute to the left by pivoting each chute segment to the left with respect to the chute segment adjacent thereto and behind it. In addition, this arrangement of linear actuator and links permits the linear actuator to apply a second linear force to the rear link, in the opposite direction of the first linear force, by retracting the rod end, as shown in FIG. 4, to cause the linkage system to steer the discharge chute to the right by pivoting each chute segment to the right with respect to the chute segment adjacent thereto and behind it. Of course, as will be appreciated by those having ordinary skill in the art to which the invention relates, the rod of the linear actuator may be placed in an infinite number of positions with respect to the cylinder, each of which will correspond to a particular angular orientation of the discharge chute. As shown in the drawings, the links and the actuator for the linkage system are preferably mounted on top of the plurality of adjacent chute segments, so that the linkage system will not interfere with, or be damaged by, the flow of material through the discharge chute.

Although this description contains many specifics, these should not be construed as limiting the scope of the invention, but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A discharge chute for a material reducing machine having a discharge opening, said discharge chute comprising:
   (a) a plurality of adjacent chute segments including a rear chute segment, an intermediate chute segment and a front chute segment, each of which is pivotally connected to an adjacent chute segment;
   (b) a linkage system comprising:
      (i) a plurality of links that interconnect the adjacent chute segments;
      (ii) an actuator that is adapted to cause the discharge chute to be steered to the left by pivoting the intermediate chute segment to the left with respect to the adjacent rear chute segment, and to cause the discharge chute to be steered to the right by pivoting the intermediate chute segment to the right with respect to the adjacent rear chute segment.

2. The discharge chute of claim 1 wherein the linkage system is configured and arranged so that:
   (a) the actuator will cause the discharge chute to be steered to the left by pivoting each chute segment to the left with respect to the adjacent chute segment that is behind it;
   (b) the actuator will cause the discharge chute to be steered to the right by pivoting each chute segment to the right with respect to the adjacent chute segment that is behind it.

3. The discharge chute of claim 1 wherein the links and the actuator for the linkage system are mounted on top of the plurality of adjacent chute segments.

4. The discharge chute of claim 1 wherein:
   (a) each chute segment has:
      (i) a centerline;
      (ii) a pivotal connection with an adjacent chute segment;
   (b) the chute segments are arranged so that the centerlines of adjacent chute segments intersect at the pivotal connection between such chute segments.

5. A discharge chute for a material reducing machine having a discharge opening, said discharge chute comprising:
   (a) a plurality of adjacent chute segments, each of which is pivotally connected to an adjacent chute segment, said plurality of chute segments including a rear chute segment which has a rear end that is attached to the material reducing machine at the discharge opening, an intermediate chute segment, and a front chute segment which:
      (i) has a front end through which material may be discharged;
      (ii) has a centerline;
   (b) a linkage system comprising:
      (i) a plurality of links that interconnect the adjacent chute segments;
      (ii) an actuator that is adapted to cause the discharge chute to be steered to the left through a range of up to about 75°, as measured by the angle formed by the intersection of the centerline of the front chute segment and the discharge direction by pivoting the intermediate chute segment to the left with respect to the adjacent rear chute segment, and to cause the discharge chute to be steered to the right through a range of up to about 75°, as measured by the angle formed by the intersection of the centerline of the front chute segment and the discharge direction by pivoting the intermediate chute segment to the right with respect to the adjacent rear chute segment.

6. The discharge chute of claim 1 wherein:
   (a) the plurality of links includes a rear link;
   (b) the actuator is adapted to apply:
      (i) a first linear force to the rear link to cause the linkage system to steer the discharge chute to the left by pivoting each chute segment to the left with respect to the chute segment adjacent thereto and behind it; and
      (ii) a second linear force to the rear link to cause the linkage system to steer the discharge chute to the right by pivoting each chute segment to the right with respect to the chute segment adjacent thereto and behind it.

7. The discharge chute of claim 6:
(a) which includes a plurality of intermediate chute segments;
(b) wherein the linkage system includes links that are arranged to comprise a four-bar linkage for each intermediate chute segment.

8. A discharge chute for a material reducing machine having a discharge opening, said discharge chute comprising:
(a) a plurality of adjacent chute segments including a rear chute segment, an intermediate chute segment and a front chute segment, each of which:
   (i) has a front end;
   (ii) has a rear end;
   (iii) has a link pivot mount;
   (iv) wherein the rear end of the intermediate chute segment is pivotally connected to the front end of the adjacent rear chute segment;
   (v) wherein the rear end of the front chute segment is pivotally connected to the front end of the adjacent intermediate chute segment;
(b) a linkage system comprising:
   (i) a plurality of links including a rear link and a pivot link, wherein said pivot link is pivotally mounted on the link pivot mount for the intermediate chute segment;
   (ii) an actuator that is adapted to apply a first linear force and a second linear force to the rear link;
   wherein the chute segments and the links of the linkage system are configured and arranged so that the application of a first linear force to the rear link causes the linkage system to steer the discharge chute to the left by pivoting each chute segment to the left with respect to the adjacent chute segment that is behind it, and the application of a second linear force to the rear link causes the linkage system to steer the discharge chute to the right by pivoting each chute segment to the right with respect to the adjacent chute segment that is behind it.

9. The discharge chute of claim 8 wherein:
(a) the rear chute segment has a centerline;
(b) the rear end of the rear chute segment is attached to the material reducing machine at the discharge opening;
(c) the front chute segment:
   (i) has a front end through which material may be discharged;
   (ii) has a centerline;
(d) the linkage system is adapted to steer the discharge chute to the left through a range of up to about 75°, as measured by the angle formed by the intersection of the centerline of the rear chute segment and the centerline of the front chute segment;
(e) the linkage system is adapted to steer the discharge chute to the right through a range of up to about 75°, as measured by the angle formed by the intersection of the centerline of the rear chute segment and the centerline of the front chute segment.

10. The discharge chute of claim 8:
(a) which includes a plurality of intermediate chute segments;
(b) wherein the linkage system includes links that are arranged to comprise a four-bar linkage for each intermediate chute segment.

11. The discharge chute of claim 8 wherein the links and the actuator for the linkage system are mounted on top of the plurality of adjacent chute segments.

12. The discharge chute of claim 8 wherein:
(a) each chute segment has:
   (i) a centerline;
   (ii) a pivotal connection with an adjacent chute segment;
(b) the chute segments are arranged so that the centerlines of adjacent chute segments intersect at the pivotal connection between such chute segments.

13. The discharge chute of claim 8 wherein:
(a) the rear chute segment has a front width at its front end;
(b) the intermediate chute segment has a front width at its front end and a rear width at its rear end;
(c) the rear width of the intermediate chute segment is larger that the front width of the rear chute segment;
(d) the front chute segment has a rear width at its rear end;
(e) the rear width of the front chute segment is larger that the front width of the intermediate chute segment.

14. The discharge chute of claim 8, said discharge chute comprising:
(a) a plurality of intermediate chute segments;
(b) a pivot link for each intermediate chute segment, wherein each such pivot link is pivotally mounted on the link pivot mount for the intermediate chute segment with which it is associated.

15. The discharge chute of claim 14 wherein the linkage system includes links that are arranged to comprise a four-bar linkage for each intermediate chute segment.

16. The discharge chute of claim 8 wherein the pivot link that is associated with the intermediate chute segment:
(a) has a left pivot point;
(b) has a right pivot point;
(c) has an intermediate pivot point between the left pivot point and the right pivot point;
(d) is pivotally mounted at its intermediate pivot point to the link pivot mount of the intermediate chute segment.

17. The discharge chute of claim 16 wherein the linkage system includes a centerline link that is associated with the intermediate chute segment, which centerline link has a front end and a rear end.

18. The discharge chute of claim 17 wherein:
(a) the front end of the centerline link is pivotally mounted at the right pivot point of the pivot link that is associated with the intermediate chute segment;
(b) the rear link has a centerline pivot point, a left pivot point and an intermediate pivot point between the centerline pivot point and the left pivot point, said rear link being pivotally mounted at its intermediate pivot point to the link pivot mount of the rear chute segment;
(c) the rear end of the centerline link that is associated with the intermediate chute segment is pivotally mounted to the centerline pivot point of the rear link.

19. The discharge chute of claim 18 wherein the linkage system includes a steering link that is associated with the intermediate chute segment, which steering link has a front end and a rear end.

20. The discharge chute of claim 19 wherein:
(a) the front end of the steering link is pivotally mounted to the intermediate pivot point of the pivot link that is associated with the intermediate chute segment;
(b) the rear end of the steering link is pivotally mounted to the left pivot point of the rear link.

* * * * *